Aug. 18, 1931.     J. C. CROWLEY     1,819,150
VALVE STEM
Filed March 21, 1929     2 Sheets-Sheet 1
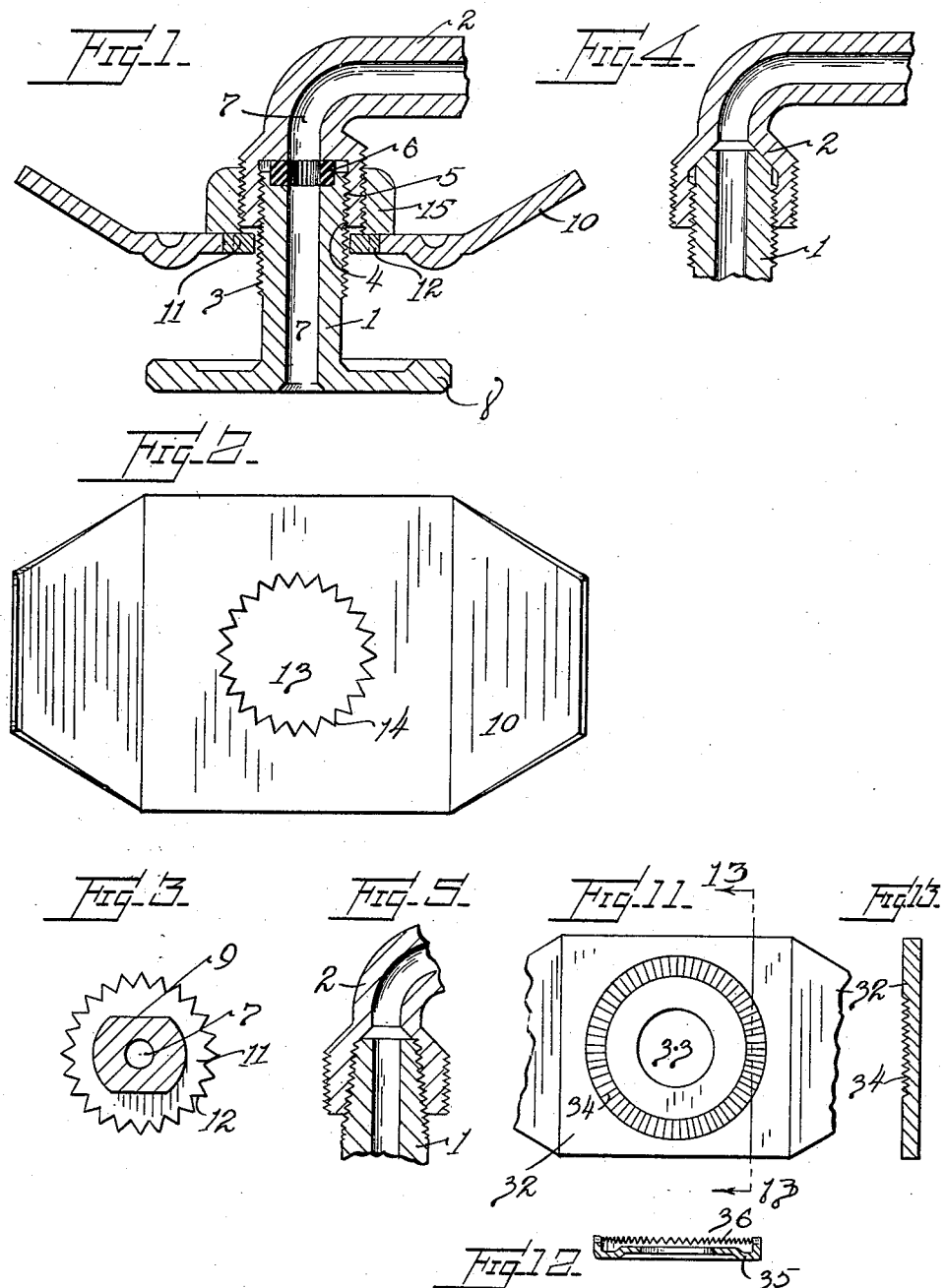

Aug. 18, 1931. J. C. CROWLEY 1,819,150
VALVE STEM
Filed March 21, 1929 2 Sheets-Sheet 2
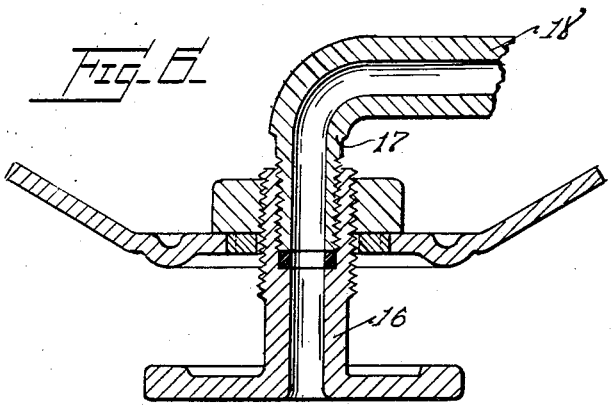
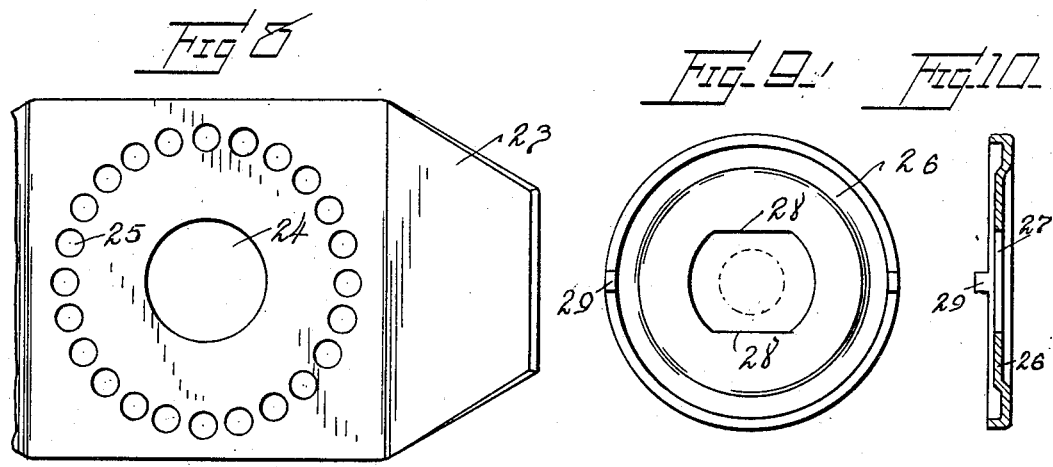
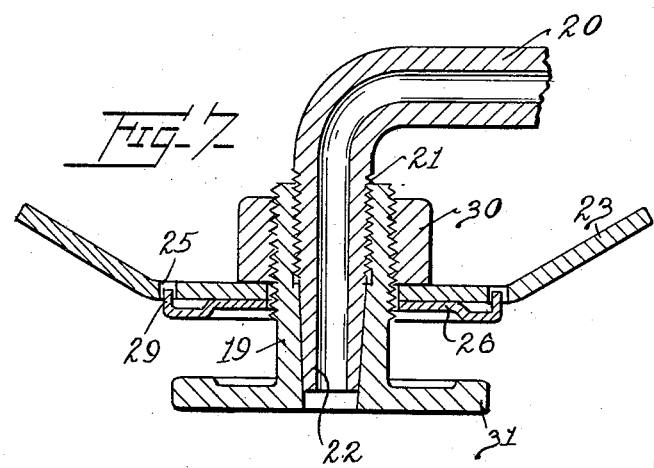
Inventor
John C. Crowley
Rives Hudson & Kent
Attys Patented Aug. 18, 1931　　　　　　　　　　　　　　　　　　　　1,819,150

UNITED STATES PATENT OFFICE

JOHN C. CROWLEY, OF CLEVELAND HEIGHTS, OHIO, ASSIGNOR TO THE DILL MANUFACTURING COMPANY, OF CLEVELAND, OHIO, A CORPORATION OF OHIO

VALVE STEM

Application filed March 21, 1929. Serial No. 348,735.

This invention relates to a valve stem construction, and more particularly to the construction of a spreader plate used with the valve stem.

In certain types of valve stems, especially two-piece valve stems wherein a metal to metal seat between the two pieces of the stem is provided, it is necessary to make some provision so that the spreader plate will be properly aligned, irrespective of the position of the valve stem, and accordingly an object of the present invention is to provide a spreader plate which may be properly positioned always independently of the position of the valve stem.

There are certain types of two-piece valve stems, such as used in truck and bus equipment, wherein the end of the valve stem carrying the valve insides is arranged adjacent the rim flange of the wheel, and the present invention is particularly adapted for use with such stems, although, of course, not limited to such use alone, since it has utility in connection with any type of valve stem.

Another object of the invention is to provide an adjustable spreader plate construction, which is simple, readily adjusted to properly position the plate, and which may be economically manufactured.

A further object of the invention is to provide a two-part valve stem, the parts of which are detachable and have when assembled together a metal to metal engagement or seat.

Additional objects and advantages will become apparent hereinafter.

Several embodiments of the invention are illustrated in the accompanying drawings, wherein, Figure 1 is a sectional view through a two-piece valve stem construction, and one form of adjustable spreader plate.

Figure 2 is a top plan view of the spreader plate shown in Fig. 1.

Figure 3 is a sectional view through the valve stem showing the spreader plate washer in plan.

Figure 4 is a sectional view through a two-piece valve stem, showing a modified form of connecting the two pieces of the stem together.

Figure 5 is a view similar to Figure 4, showing a still different form of connection between the two pieces of the valve stem.

Figure 6 is a sectional view similar to Fig. 1, showing a modified form of connection between the two pieces of the valve stem.

Figure 7 is a sectional view through a different form of two-piece valve stem, and through a modified form of adjustable spreader plate.

Figure 8 is a fragmentary plan of the spreader plate shown in Fig. 7.

Figure 9 is a sectional view through the valve stem and shows the spreader plate washer in top plan.

Figure 10 is a sectional view of the spreader plate washer shown in Fig. 1.

Figure 11 is a top plan of a modified form of spreader plate.

Figure 12 is a sectional view of the spreader plate washer to be used with the form shown in Fig. 11, and Figure 13 is a sectional view of the spreader plate shown in Fig. 11 and is taken on line 13—13 of Fig. 11.

Referring to Figures 1 to 3, inclusive, the valve stem is disclosed as formed of the two parts 1 and 2, the former part being the valve stem proper and the latter part the adapter, one end of the part 1 being exteriorly threaded at 3 to cooperate with the interior threads 4 formed within an enlarged socket portion 5 on the end of the adapter part 2. The two parts 1 and 2 are secured together merely by screwing the threaded end of the part 1 into the socket 5 of the part 2. In order to provide an air-tight connection, the upper end of the part 1 is formed with a counter-bore within which is arranged a soft metal packing 6. Both parts of the valve stem are provided with an air passageway or bore 7.

The lower end of the part 1 is provided with the usual head 8, adapted to be arranged within a tire tube, so that the part 1 can extend outwardly thereof. The part 1 is also provided on its exterior surface with the usual flats 9, which flats are for the purpose of locating or positioning the spreader plate 10. Since the two valve stem parts are screwed together it might occur that when they have been tightly joined that the part 2 would not necessarily line up in the correct relation to the flats on the part 1, and that it would be difficult to properly position the spreader plate and, therefore, it is proposed to provide an adjustable spreader plate. In carrying this out a washer 11 provided with a central opening having flats corresponding to the flats 9 is adapted to be positioned upon the part 1 of the valve stem. This washer is notched or serrated, as indicated at 12, around its circumferential edge. The spreader plate 10 is provided with a central opening 13, the circumferential edge of which is notched or serrated, as shown at 14, so that when the spreader plate is positioned over the valve stem the opening 13 will surround the washer 11, and the plate can be properly positioned by turning the same the desired amount, after which it will be held in such position by the engagement of notches and projections 14 with the complementary notches and projections 12 of the washer 11. The assembly is held on the tire tube by the usual nut 15, which engages exterior threads arranged on the socket portion 5 of the part 2 of the valve stem.

In Figure 4 parts 1 and 2 of the valve stem are shown as connected with a seat and socket connection, while in Figure 5 the parts 1 and 2 are shown as connected by a pipe thread connection.

In Figure 6 a modified form of valve stem is disclosed, wherein the part 16 is provided with a threaded socket at its upper end adapted to receive a reduced threaded portion 17 of the part 18. The part 16 is also exteriorly threaded so as to receive the assembling nut, while the spreader plate and washer construction shown therein is identical with that previously described.

In Figure 7 a still different form of two-piece valve stem is disclosed. This stem comprises the part 19, which has a threaded bore adjacent one end and a tapered bore adjacent its other end. The part 20 of the stem is provided with a threaded portion 21 and with a tapered portion 22, the former portion cooperating with the threaded bore of the part 19, while the tapered portion 22 cooperates with the tapered bore of the part 19 and forms an air-tight connection. A different form of spreader plate is disclosed in connection with this form of valve stem construction, it being understood, however, that the spreader plate, so disclosed, could be used with any of the other forms of valve stem constructions hereinbefore set forth.

The spreader plate 23 is provided with a central circular opening 24, adapted to fit over the valve stem part 19, while outwardly of the opening 24 the plate 23 has a series of openings or depressions 25 arranged in a circle concentric with the opening 24. It will be noticed that when the spreader plate 23 is positioned over the valve stem part 19 that it will be free to be moved to any position of adjustment. In order to hold the spreader plate in the proper position a spring washer 26 is provided. This washer has a central opening 27, the edge of which is provided with flats adapted to cooperate with flats 28 formed on the part 19, while the circumference of the washer 26 has a plurality of upstanding lugs 29, spaced circumferentially thereof, and adapted to underlie the openings or depressions 25 in the plate 23.

It will be obvious that when the washer 26 is positioned on the valve stem part 19 that it will be possible to correctly position the spreader plate 23, after which the upstanding lugs 29 of the washer will spring into the adjacent openings or depressions 25 of the spreader plate and hold the same in adjusted position. When the valve parts have been assembled and the spreader plate properly positioned, the assembling nut 30 may then be screwed down upon the spreader plate until the plate firmly clamps the tire tube between it and the head 31 carried by the lower end of the part 19, such clamping action also more firmly forcing the lugs 29 into the openings or depressions 25.

In Figures 11, 12 and 13 a different form of spreader plate is disclosed. The spreader plate 32 shown therein is provided with a circular centrally arranged opening 33, outwardly of which it is provided on its under side with a series of pointed or toothed projections 34 arranged in a circle concentric with the opening 33. A washer member 35 having a central opening provided with flats is positioned upon the valve stem, so that projections 36 arranged on its periphery will extend upwardly. The spreader plate 32 being positioned upon the valve stem with the projections 34 thereof extending downwardly, it will be obvious that when the assembling nut is turned home that it will force the spreader plate downwardly so that the projections 34 will engage with the projections 36 of the washer and hold the plate in the proper position of adjustment.

Although several embodiments of the invention have been illustrated and described herein, it should be understood that the invention is susceptible of various other modifications and adaptations within the scope of the appended claims.

Having thus described my invention, I claim:

1. A spreader plate adapted to be used with a valve stem comprising a plate member provided with a centrally arranged opening and adapted to be adjustably arranged on a valve stem, and a washer member having a central opening provided with flats and adapted to be arranged on a valve stem with said flats engaging the usual flats on the stem, said plate member and said washer member having cooperating portions which when interengaged hold said plate member in its various positions of adjustment.

2. A spreader plate adapted to be used with a valve stem comprising a plate member provided with a centrally arranged opening and adapted to be adjustably arranged on a valve stem, and a washer member having a central opening provided with flats and adapted to be arranged on a valve stem with said flats engaging the usual flats on the stem, said plate member and said washer member having cooperating projections and depressions adapted when interengaged to hold said plate member in its various positions of adjustment.

3. A spreader plate adapted to be used with a valve stem comprising a plate member provided with a centrally arranged opening and adapted to be adjustably arranged on a valve stem, said opening being provided with a serrated edge, and a washer member having a central opening provided with flats and adapted to be arranged on a valve stem with said flats engaging the usual flats on the stem, said washer member having its circumferential edge serrated and when assembled adapted to lie within the opening in the plate member.

4. A spreader plate adapted to be used with a valve stem comprising a plate member provided with a centrally arranged opening and with a series of depressions circularly arranged outwardly of the opening and concentric therewith, said plate member being adapted to be adjustably arranged on a valve stem, and a washer member having a central opening provided with flats and adapted to be arranged on a valve stem with said flats engaging the usual flats on the stem, said washer member being provided with a series of projections circularly arranged outwardly of the opening therein and concentric therewith, which projections are adapted to engage with the depressions in the plate member to hold the same in various positions of adjustment.

In testimony whereof, I hereunto affix my signature.

JOHN C. CROWLEY.